United States Patent
Jewess et al.

(10) Patent No.: US 7,748,208 B2
(45) Date of Patent: Jul. 6, 2010

(54) COMPACT RECIRCULATING LUBRICATION SYSTEM FOR A MINIATURE GAS TURBINE ENGINE

(75) Inventors: Gordon F. Jewess, San Diego, CA (US); Anthony C. Jones, San Diego, CA (US); Robert O. Barkley, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 883 days.

(21) Appl. No.: 11/633,280

(22) Filed: Dec. 4, 2006

(65) Prior Publication Data

US 2008/0127627 A1 Jun. 5, 2008

(51) Int. Cl.
*F02C 7/06* (2006.01)

(52) U.S. Cl. .................... 60/39.08; 184/6.11
(58) Field of Classification Search .............. 60/39.08; 184/6.11
See application file for complete search history.

(56) References Cited

U.S. PATENT DOCUMENTS

| | | | | |
|---|---|---|---|---|
| 2,400,392 A | * | 5/1946 | Davenport | 184/6.13 |
| 2,474,258 A | * | 6/1949 | Kroon | 60/39.08 |
| 2,487,842 A | * | 11/1949 | Whiteman et al. | 60/39.08 |
| 3,378,104 A | * | 4/1968 | Venable | 60/39.08 |
| 3,856,114 A | * | 12/1974 | Zankl | 184/6.1 |
| 4,284,174 A | * | 8/1981 | Salvana et al. | 60/39.08 |
| 7,216,473 B1 | * | 5/2007 | McArthur et al. | 60/39.08 |
| 7,475,549 B2 | * | 1/2009 | Alexander et al. | 60/39.08 |
| 7,640,723 B2 | * | 1/2010 | Alexander | 60/39.08 |

* cited by examiner

*Primary Examiner*—Ted Kim
(74) *Attorney, Agent, or Firm*—Stephen G. Mican

(57) ABSTRACT

A recirculating bearing lubrication system for a gas turbine engine that comprises a housing for the engine that serves as a primary static structural support, a rotor shaft for mounting rotational components of the engine, at least two bearings for supporting the rotor shaft within the housing and an air intake for supplying engine air comprises a generally annular lubricant source mounted about the engine intake to cool lubricant for the bearings; a solenoid that seals the lubricant from air contamination during storage of the engine and unseals it upon starting the engine; a lubricant pump that circulates the lubricant; at least one lubricant spray jet that receives circulating lubricant and sprays lubricant onto the bearings; and a sump for collecting excess lubricant sprayed on the bearings.

22 Claims, 4 Drawing Sheets

COMPACT RECIRCULATING LUBRICATION SYSTEM FOR A MINIATURE GAS TURBINE ENGINE

FIELD OF THE INVENTION

The invention relates to lubrication systems for gas turbine engines, and more particularly to a recirculating lubrication system for a miniature gas turbine engine.

BACKGROUND OF THE INVENTION

Miniature gas turbine or turbojet engines, typically of 150 lb-f thrust and smaller, are often useful for single-use airborne applications such as reconnaissance drones and other unmanned air and ground launched aeronautical vehicles. The use of such an engine greatly extends the range of such vehicles in comparison to the more conventional solid fuel rocket engine.

A miniature gas turbine engine must have a relatively inexpensive manufacturing cost coupled with a high degree of starting and operational reliability when launched from air or ground systems in order to be an economically feasible extended range expendable propulsion source for such applications. The high-speed ball bearings in a bearing system that support the rotating turbine machine are one type of component that greatly affects mechanical performance and reliability of a miniature gas turbine engine. Reliability and efficiency of the bearings in the bearing system are prime concerns for a successful expendable turbine engine. The most common cause of reduced reliability and efficiency of an expendable turbine engine bearing system is poor or inadequate lubrication of the bearings.

Although bearing systems for large reusable provide satisfactory reliability and efficiency, they employ a relatively complex closed circuit lubrication system that is relatively expensive to manufacture and difficult to maintain under the long term storage conditions needed for typical single use miniature gas turbine engines. Accordingly, it is desirable to achieve bearing lubrication with the reliability and efficiency of large turbine engines in an uncomplicated and inexpensive bearing lubrication system for a miniature gas turbine engine that assures a similar degree of operational efficiency and reliability.

SUMMARY OF THE INVENTION

Generally, the invention comprises a recirculating bearing lubrication system for a gas turbine engine that comprises a housing for the engine that serves as a primary static structural support, a rotor shaft for mounting rotational components of the engine, at least two bearings for supporting the rotor shaft within the housing and an air intake for supplying engine air comprises a generally annular lubricant source mounted about the engine intake to cool lubricant for the bearings; a solenoid that seals the lubricant from air contamination during storage of the engine and unseals it upon starting the engine; a lubricant pump that circulates the lubricant; at least one lubricant spray jet that receives circulating lubricant and sprays lubricant onto the bearings; and a sump for collecting excess lubricant sprayed on the bearings.

DETAILED DESCRIPTION OF THE INVENTION

Figure 1:
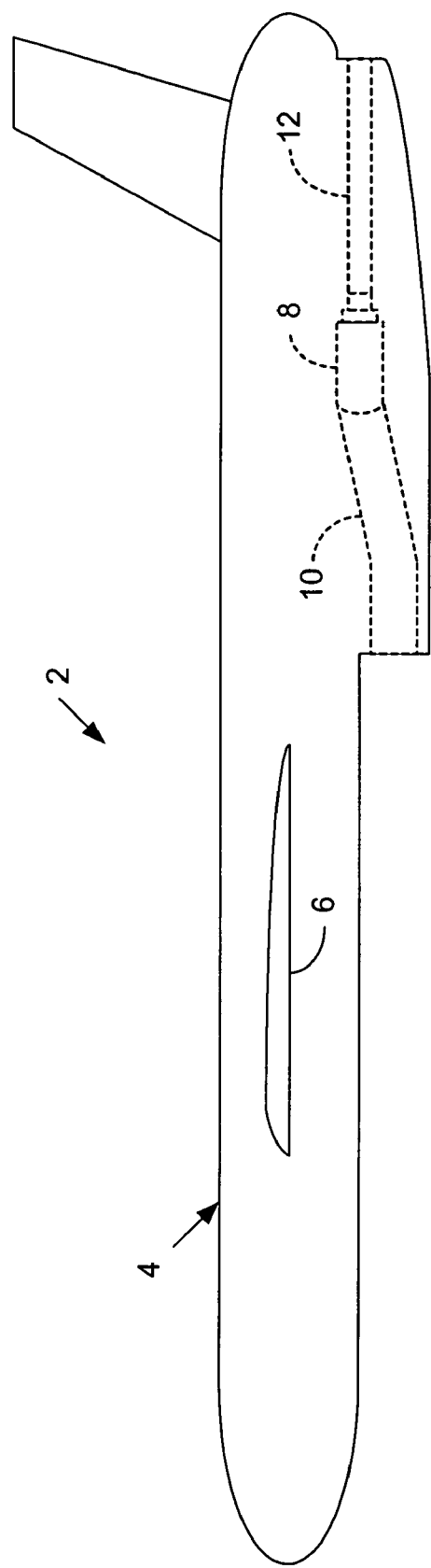
FIG. 1 is a side view of an expendable aeronautical vehicle that is suitable for incorporating at least one embodiment of the invention.

FIG. 1 is a side view of an expendable aeronautical vehicle 2 that is suitable for incorporating at least one embodiment of the invention. The vehicle 2 comprises an airframe 4 with one or more aerodynamic surfaces 6. The vehicle 2 also comprises a propulsion engine 8, typically of the gas turbine or turbojet type. The engine 8 mounts within or to the vehicle 2. In FIG. 1, for purposes of illustration the engine 8 mounts within the vehicle 2, as shown in dashed line. An intake 10, shown in dashed line, supplies ambient air to the engine 8. An exhaust pipe 12, shown in dashed line, exhausts the thrust of the engine 8 to propel the vehicle 2.

Figure 2:
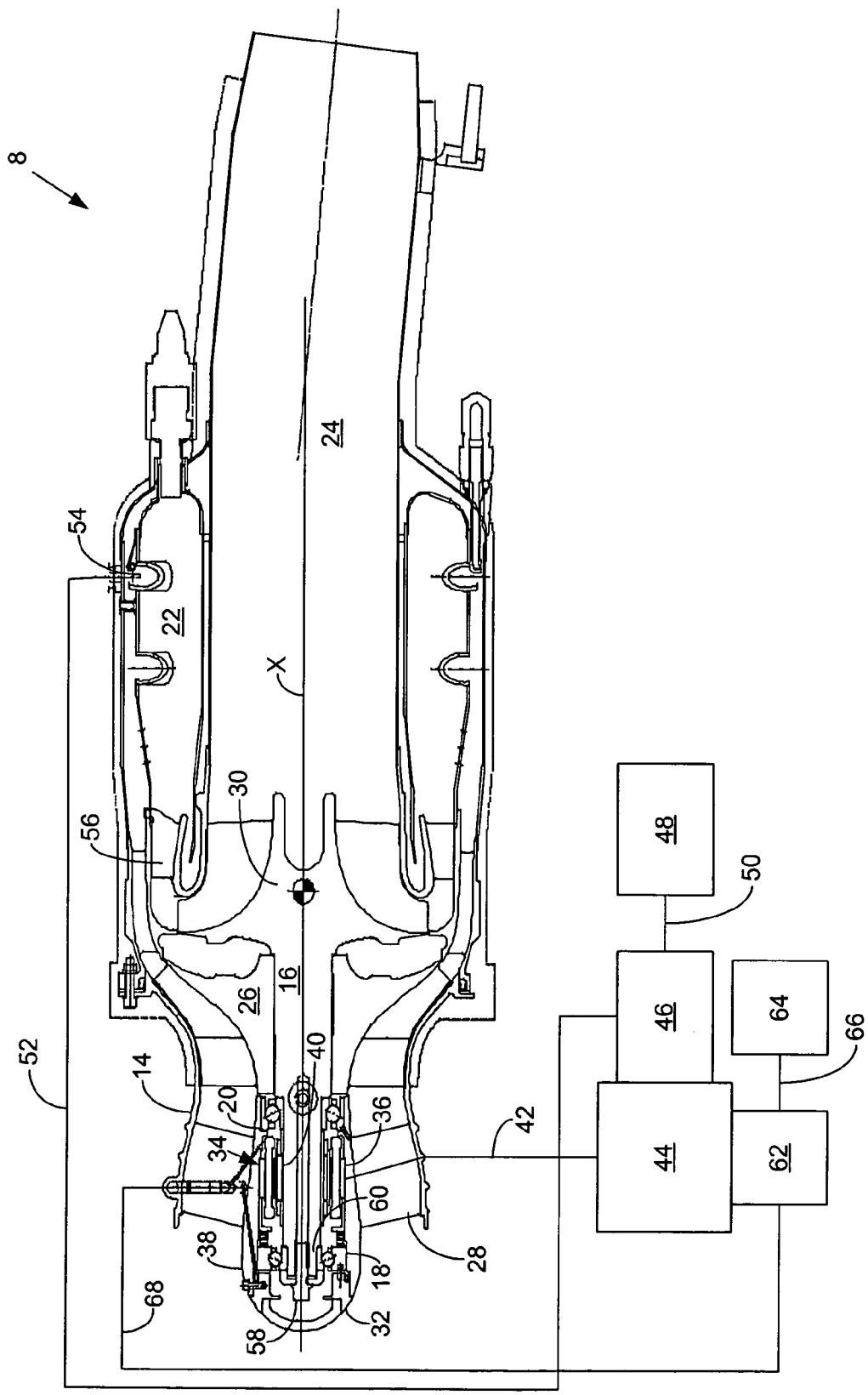
FIG. 2 is a cut-away side view of a miniature turbine engine for the expendable aeronautical vehicle shown in FIG. 1 that is suitable for incorporating at least one embodiment of the invention.

FIG. 2 is a cut-away side view of a miniature turbine engine 8 for the expendable aeronautical vehicle shown in FIG. 1 that is suitable for incorporating the invention. The miniature gas turbine engine 8 generally comprises a housing 14, a rotor shaft 16 supported by a forward bearing 18 and an aft bearing 20, a generally annular combustion chamber 22 and an exhaust pipe 24. The forward bearing 18 and the aft bearing 20 allow the rotor shaft 16 to rotate about a longitudinal axis X. The forward bearing 19 and the aft bearing 20 are both of the ball bearing type.

A multi-bladed compressor wheel 26 mounted on the rotor shaft 16 faces forward toward an intake 28 and a multi-bladed turbine wheel 30 mounted on the rotor shaft 16 faces rearward toward the exhaust pipe 24. The forward bearing 18 and the aft bearing 20 support the rotor shaft 16 to extend it at least partially into a forward cover 32. The forward cover 32 is preferably the forward-most portion of the engine 8 and defines an aerodynamically contoured shape. The intake 28 generally surrounds the forward cover 32 to facilitate airflow.

A permanent magnet generator (PMG) 34 preferably mounts on the rotor shaft 16 between the forward bearing 18 and the aft bearing 20 to generate electrical power for the engine 8 and other accessories. The PMG 34 comprises a stator 36 that mounts to the housing 14 by way of a housing inner support 38 and a rotor 40 mounted on the rotor shaft 16. An electrical power line 42 transfers electrical power from the PMG 34 to an electrical power system 44.

A fuel pump 46 to pump fuel from a fuel source 48 by way of a fuel source line 50 pumps fuel to the annular combustion chamber 22 by way of a pump supply line 52 through a fuel manifold 54. The electrical power system 44 preferably drives the fuel pump 46, although alternatively the turbine wheel 30 could drive the fuel pump 46 by way of a suitable transmission (not shown) coupled to the rotor shaft 16. The fuel burns at high temperatures within the combustor chamber 22 to generate expanding exhaust gases that flow through a turbine nozzle 56, the turbine wheel 30 and the exhaust pipe 24 thereby driving the turbine wheel 30 and generating a high velocity thrust out of the exhaust pipe 24.

A fastener 58, such as a threaded rotor nut or bolt, may conveniently couple to a mating end portion 60 of the rotor shaft 16, such as a threaded stud or aperture, to retain the rotor shaft 16 within the forward bearing 18 and the aft bearing 20.

The housing inner support 38 conveniently mounts the forward bearing 18 and the aft bearing 20 to the housing 14.

The housing 14 provides the primary static structural support for rotation of the rotor shaft 16 and the hereinbefore-described rotational components mounted on it. The fastener 58 extends at least partially within he forward cover 32. The forward cover 32 mounts to the housing 14. Removal of the forward cover 32 facilitates assembly and disassembly by providing access to the fastener 58.

A lubricant pump 62 to pump fuel from a lubricant source 64 by way of a lubricant source line 66 pumps to the bearings 18 and 20 by way of a lubricant supply line 68. The lubricant supply line 68 may conveniently supply a plurality radial lubricant passages (not shown) arranged about each of the bearings 18 and 20. In any case, the lubricant delivery preferably sprays lubricant onto the bearings 18 and 20. Such lubrication delivery still further improves reliable operation.

Figure 3:
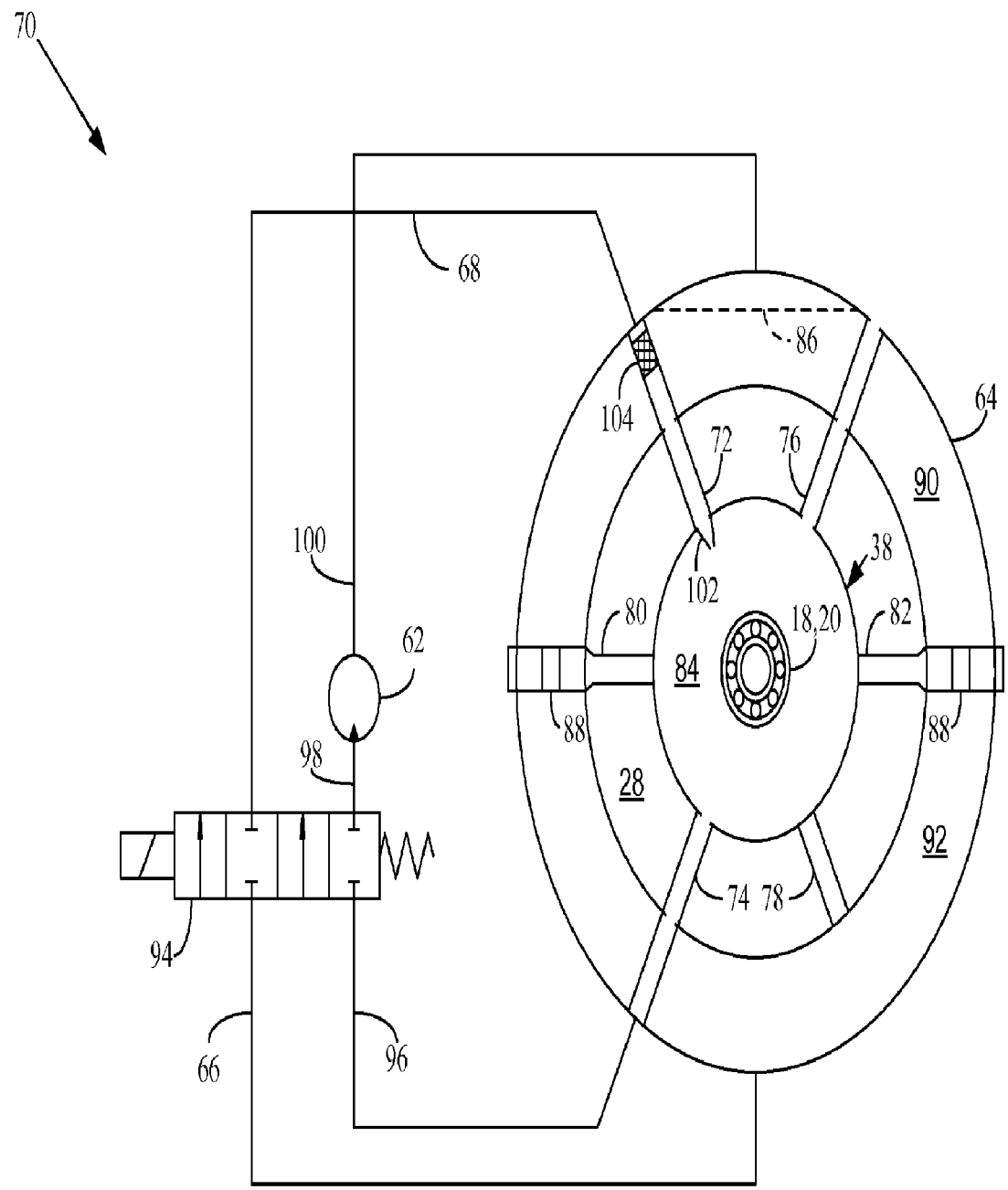
FIG. 3 is a cut-away end view of a lubrication system for bearings in the miniature turbine engine shown in FIG. 2 according to a first possible embodiment of the invention.

FIG. 3 is a cut-away end view of a lubrication system 70 for bearings 18 and 20 in the miniature turbine engine 2 shown in FIG. 2 according to a first possible embodiment of the invention. The lubricant source 64 comprises a generally annular lubricant tank that mounts about the intake 28 along the housing 14. The housing inner support 38 within the intake 28 comprises a plurality of struts, such as struts 72, 74, 76, 78, 80 and 82. The housing inner support 38 contains the bearings 18 and 20 as well as the PMG 34 as hereinbefore described.

Struts 72 and 74 are hollow so that lubricant may pass into or out of an inner chamber 84 of the housing support 38. During storage, lubricant preferably fills or nearly fills the lubricant source 64 as represented by dashed line 86 to minimise exposure to air that might result in contamination of the lubricant. Although struts 80 and 82 serve the purpose of mounting the housing inner support 38 and the lubricant source 70 to the housing 14, they have at least passages 88 that allow the flow of lubricant from an upper portion 90 of the lubrication source to a lower portion 92 of the lubrication source 70.

Conveniently, one additional strut, such as strut 76, may be hollow to provide a conduit for wiring (not shown) associated with the PMG 34 that may be within the housing inner support 38. Additional struts, such as strut 78, may provide additional bracing for the inner housing support 38.

Upon starting the engine 2, a solenoid valve 94 shifts from a de-energised state as shown in FIG. 3 to an energised state. In the energised state, the lubricant pump 62 sucks air from the inner chamber 84 that serves as a sump for the bearings 18 and 20 by way of the hollow strut 74, sump outlet line 96 and a pump supply line 98. The lubricant pump 62 discharges pressurised air into the lubricant source 64 by way of a pump discharge line 100. The resulting pressure forces lubricant through at least one lubricant spray jet 102 by way of lubricant source line 66, lubricant supply line 68 and hollow strut 72. Conveniently, a lubricant filter 104 may mount within the hollow strut 72 to filter the lubricant before it passes through each lubricant spray jet 102.

As each lubricant spray jet 102 sprays lubricant upon the bearings 18 and 20, excess lubricant collects within the inner chamber or sump 84. The lubricant pump 62 then starts to suck lubricant or a mixture of lubricant and air to recirculate the lubricant through the lubrication system 70. This embodiment of the invention thus acts as a "dry sump" recirculating lubrication system. Since the lubrication source 64 mounts around the intake 28 of the engine 2, circulating air entering the intake 28 cools the lubricant as it recirculates through the lubrication system 70. During storage, with the lubricant source 64 filled or nearly filled with lubricant, the de-energised solenoid valve 94 seals the lubricant within the lubricant source 64 so that air cannot contaminate the lubricant even with extended storage. Since the lubrication system 70 is a dry sump system, no lubricant subject to contamination by air is present in the inner chamber or sump 84 during storage.

Figure 4:
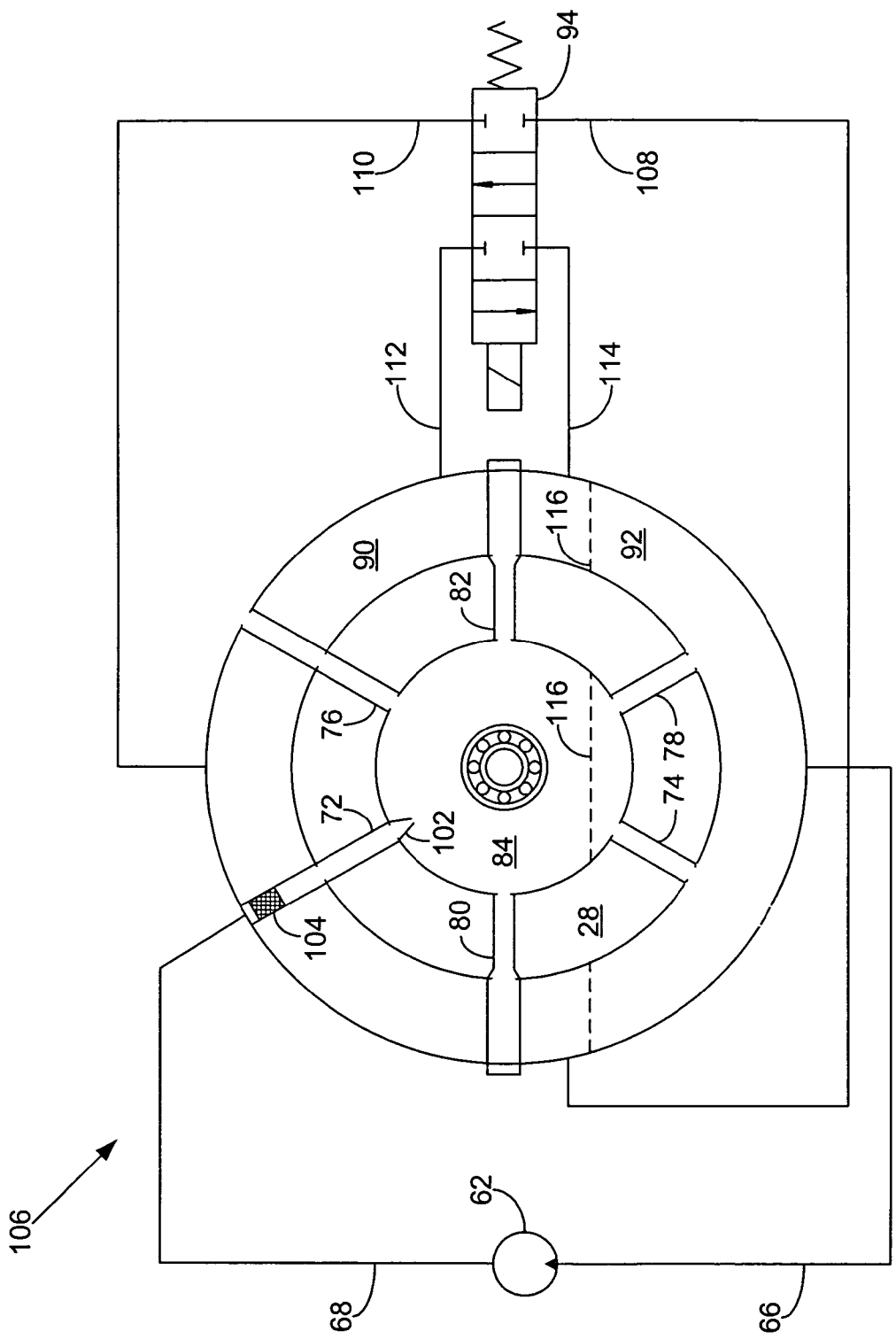
FIG. 4 is a cut-away end view of a lubrication system for bearings in the miniature turbine engine shown in FIG. 2 according to a second possible embodiment of the invention.

FIG. 4 is a cut-away end view of a lubrication system 106 for bearings 18 and 20 in the miniature turbine engine 2 shown in FIG. 2 according to a second possible embodiment of the invention. In this embodiment, the struts 80 and 82 serve as a barrier between the upper portion 90 and the lower portion 92 of the lubricant source 64. During storage, lubricant fills or nearly fills the upper portion 90. Upon starting the engine 2, the solenoid valve 94 shifts from a de-energised state as shown in FIG. 4 to an energised state. The solenoid 94 allows air pressure in the lower portion 92 to discharge into the upper portion 90 by way of lower portion pressure relief line 108 and upper portion pressure discharge line 110. At the same time, the solenoid 94 allows lubricant stored in the upper portion 92 to discharge into the lower portion 90 by way of an upper portion discharge line 112 and a lower portion supply line 114.

At least one strut, such as struts 74 and 76, are hollow and form passages for lubricant between the lower portion 92 and the inner chamber or sump 84. After all of the lubricant discharges from the upper portion 90, the lubricant reaches a level in both the lower portion 92 and the inner chamber or sump 84 indicated by dashed line 116. Thus, upon starting the engine 2, the lubrication system 106 becomes a wet sump recirculating lubrication system.

After the lubricant discharges into the lower portion 92 and the inner chamber or sump 84, the lubricant pump 62 sucks lubricant from the lower portion 92 of the lubricant source 70 by way of lubricant source line 66 and discharges pressurised lubricant through at least one lubricant spray jet 102 by way of the lubricant supply line 66 and the strut 72. Once again, the lubricant filter 104 may conveniently mount within the hollow strut 72 to filter the lubricant before it passes through each lubricant spray jet 102. As each lubricant spray jet 102 sprays lubricant upon the bearings 18 and 20, excess lubricant collects within the inner chamber or sump 84. The lubricant pump 62 continues to suck the lubricant from the lower portion 92 of the lubrication system 70 and discharge it through each lubricant spray jet 102. Thus, upon starting the engine 2, the lubrication system 106 becomes a wet sump recirculating lubrication system.

During storage, with the upper portion 90 of the lubricant source 64 filled or nearly filled with lubricant, the de-energised solenoid valve 94 seals the lubricant within the upper portion 90 of the lubricant source 64 so that air cannot contaminate the lubricant even with extended storage. Since the lubrication source 64 mounts around the intake 28 of the engine 2, circulating air entering the intake 28 cools the lubricant as it recirculates through the lubrication system 70.

Both of the described embodiments seal and protect lubricant for the engine 2 from air contamination even after long periods of storage. They both recirculate the lubricant and cool it with circulating air that enters the intake 28 of the engine 2. The described embodiments of the invention are only some illustrative implementations of the invention wherein changes and substitutions of the various parts and arrangement thereof are within the scope of the invention as set forth in the attached claims.

The claimed invention is:

1. A recirculating bearing lubrication system for a gas turbine engine that comprises a housing for the engine that serves as a primary static structural support, a rotor shaft for mounting rotational components of the engine, at least two bearings for supporting the rotor shaft within the housing and an air intake for supplying engine air, comprising:
    a generally annular lubricant source mounted about the engine intake to cool lubricant for the bearings;
    a solenoid that seals the lubricant from air contamination during storage of the engine and unseals it upon starting the engine;
    a lubricant pump that circulates the lubricant;
    at least one lubricant spray jet that receives circulating lubricant and sprays lubricant onto the bearings; and
    a sump for collecting excess lubricant sprayed on the bearings.

2. The recirculating bearing lubrication system of claim 1, wherein lubricant nearly fills the lubricant source during storage to prevent air contamination.

3. The recirculating bearing lubrication system of claim 1, wherein the solenoid valve when energised permits the lubricant pump to suck air, lubricant, and a mixture of air and lubricant from the sump and discharge it into the lubricant source.

4. The recirculating bearing lubrication system of claim 1, wherein the solenoid valve when energised permits each lubricant spray jet to receive pressurised lubricant from the lubricant source.

5. The recirculating bearing lubrication system of claim 1, wherein the sump is nearly free of lubricant upon starting the engine.

6. The recirculating bearing lubrication system of claim 1, wherein lubricant nearly fills an upper portion of the lubricant source during storage to prevent air contamination.

7. The recirculating bearing lubrication system of claim 1, wherein the solenoid valve when energised permits lubricant to drain from the upper portion of the lubricant source to a lower portion of the lubricant source and the sump.

8. The recirculating bearing lubrication system of claim 1, wherein the solenoid valve when energised permits pressurised air in the lower portion of the lubricant source to discharge into the upper portion of the lubricant source.

9. The recirculating bearing lubrication system of claim 1, wherein the lubricant pump sucks lubricant from the lubricant source and each lubricant spray jet receives lubricant from the lubricant pump.

10. The recirculating bearing lubrication system of claim 1, wherein the sump is free of lubricant during storage.

11. A recirculating bearing lubrication system for a gas turbine engine that comprises a housing for the engine that serves as a primary static structural support, a rotor shaft for mounting rotational components of the engine, at least two bearings for supporting the rotor shaft within the housing and an air intake for supplying engine air, comprising:
    a generally annular lubricant source mounted about the engine intake to cool lubricant for the bearings with the lubricant nearly filling the lubricant source during storage;
    a solenoid that seals the lubricant from air contamination during storage of the engine and unseals it upon starting the engine;
    a lubricant pump that circulates the lubricant;
    at least one lubricant spray jet that receives circulating lubricant and sprays lubricant onto the bearings; and
    a sump for collecting excess lubricant sprayed on the bearings that is nearly free of lubricant upon starting the engine;
    wherein the solenoid valve when energised permits the lubricant pump to suck air, lubricant, and a mixture of air and lubricant from the sump and discharge it into the lubricant source and permits each lubricant spray jet to receive pressurised lubricant from the lubricant source.

12. A recirculating bearing lubrication system for a gas turbine engine that comprises a housing for the engine that serves as a primary static structural support, a rotor shaft for mounting rotational components of the engine, at least two bearings for supporting the rotor shaft within the housing and an air intake for supplying engine air, comprising:
    a generally annular lubricant source mounted about the engine intake to cool lubricant for the bearings with the lubricant nearly filling an upper portion of the lubricant source during storage;
    a solenoid that seals the lubricant from air contamination during storage of the engine and unseals it upon starting the engine;
    a lubricant pump that sucks lubricant from the lubricant source;
    at least one lubricant spray jet that receives lubricant from the lubricant pump and sprays lubricant onto the bearings; and
    a sump for collecting excess lubricant sprayed on the bearings;
    wherein the solenoid valve when energised permits lubricant to drain from the upper portion of the lubricant source to a lower portion of the lubricant source and the sump and permits pressurised air in the lower portion of the lubricant source to discharge into the upper portion of the lubricant source.

13. A gas turbine engine comprising:
    a housing for the engine that serves as a primary static structural support;
    a rotor shaft for mounting rotational components of the engine;
    at least two bearings for supporting the rotor shaft within the housing;
    an air intake for supplying engine air;
    a generally annular lubricant source mounted about the engine intake to cool lubricant for the bearings;
    a solenoid that seals the lubricant from air contamination during storage of the engine and unseals it upon starting the engine;
    a lubricant pump that circulates the lubricant;
    at least one lubricant spray jet that receives circulating lubricant and sprays lubricant onto the bearings; and
    a sump for collecting excess lubricant sprayed on the bearings.

14. The engine of claim 13, wherein lubricant nearly fills the lubricant source during storage to prevent air contamination.

15. The engine of claim 13, wherein the solenoid valve when energised permits the lubricant pump to suck air, lubricant, and a mixture of air and lubricant from the sump and discharge it into the lubricant source.

16. The engine of claim 13, wherein the solenoid valve when energised permits each lubricant spray jet to receive pressurised lubricant from the lubricant source.

17. The engine of claim 13, wherein the sump is nearly free of lubricant upon starting the engine.

18. The engine of claim 13, wherein lubricant nearly fills an upper portion of the lubricant source during storage to prevent air contamination.

19. The engine of claim 13, wherein the solenoid valve when energised permits lubricant to drain from the upper portion of the lubricant source to a lower portion of the lubricant source and the sump.

20. The engine of claim 13, wherein the solenoid valve when energised permits pressurised air in the lower portion of the lubricant source to discharge into the upper portion of the lubricant source.

21. The engine of claim 13, wherein the lubricant pump sucks lubricant from the lubricant source and each lubricant spray jet receives lubricant from the lubricant pump.

22. The engine of claim 13, wherein the sump is free of lubricant during storage.

* * * * *